United States Patent
Mah et al.

(10) Patent No.: US 8,168,025 B2
(45) Date of Patent: May 1, 2012

(54) METHODS OF MAKING COMPONENTS FOR ELECTROCHEMICAL CELLS

(75) Inventors: Ronald Mah, Burnaby (CA); Kyoung J. Bai, Cranbrook (CA); Siyu Ye, Burnaby (CA); David S. de Haan, Burnaby (CA); Goran R. Vlajnic, Burnaby (CA); Andrew Leow, North Delta (CA)

(73) Assignee: BDF IP Holdings Ltd., Vancouver, BC (CA)

( * ) Notice: Subject to any disclaimer, the term of this patent is extended or adjusted under 35 U.S.C. 154(b) by 572 days.

(21) Appl. No.: 11/738,348

(22) Filed: Apr. 20, 2007

(65) Prior Publication Data

US 2008/0128074 A1   Jun. 5, 2008

Related U.S. Application Data

(60) Provisional application No. 60/872,444, filed on Apr. 21, 2006.

(51) Int. Cl.
| | |
|---|---|
| H01M 4/88 | (2006.01) |
| B44C 1/165 | (2006.01) |
| B29C 65/02 | (2006.01) |
| B32B 37/02 | (2006.01) |
| B32B 37/26 | (2006.01) |
| B32B 37/10 | (2006.01) |
| B32B 37/12 | (2006.01) |

(52) U.S. Cl. ........ 156/235; 156/230; 156/247; 156/249; 502/101; 429/40

(58) Field of Classification Search ............. 156/230, 156/235, 247, 249; 429/40; 502/101
See application file for complete search history.

(56) References Cited

U.S. PATENT DOCUMENTS

| 4,810,594 A | 3/1989 | Bregoli et al. |
| 5,211,984 A | 5/1993 | Wilson |
| 5,395,705 A | 3/1995 | Door et al. |
| 5,702,755 A * | 12/1997 | Mussell ............... 427/115 |
| 5,879,828 A | 3/1999 | Debe et al. |
| 5,935,643 A * | 8/1999 | Song et al. ............ 427/115 |
| 5,945,231 A | 8/1999 | Narayanan et al. |
| 6,103,077 A | 8/2000 | DeMarinis et al. |
| 6,197,147 B1 | 3/2001 | Bönsel et al. |
| 6,207,312 B1 * | 3/2001 | Wynne et al. .......... 429/480 |
| 6,344,428 B1 * | 2/2002 | Lim et al. ............ 502/101 |
| 6,391,486 B1 | 5/2002 | Narayanan et al. |
| 6,517,962 B1 | 2/2003 | Knights et al. |
| 6,524,736 B1 * | 2/2003 | Sompalli et al. ........ 429/535 |
| 6,641,862 B1 | 11/2003 | Grot |

(Continued)

FOREIGN PATENT DOCUMENTS

CN   1560949   1/2005

(Continued)

OTHER PUBLICATIONS

English translation of CN1560949A by Chen et al. Jan. 2005.*

(Continued)

*Primary Examiner* — Sonya Mazumdar
(74) *Attorney, Agent, or Firm* — Seed IP Law Group PLLC

(57) ABSTRACT

The present invention is related to methods of making membrane electrode assembly components. The methods include transferring a catalyst layer to a polymer electrolyte membrane or a gas diffusion layer. Methods of making membrane electrode assemblies with these components are also disclosed.

12 Claims, 4 Drawing Sheets

U.S. PATENT DOCUMENTS

| | | | |
|---|---|---|---|
| 6,713,207 B2 * | 3/2004 | Tsusaka et al. | 429/481 |
| 6,713,424 B2 | 3/2004 | Stumper et al. | |
| 6,723,464 B2 | 4/2004 | Tabata et al. | |
| 6,933,003 B2 | 8/2005 | Yan | |
| 6,977,234 B2 | 12/2005 | Kosako et al. | |
| 7,091,149 B2 | 8/2006 | Iwasaki et al. | |
| 7,141,270 B2 | 11/2006 | Wittpahl et al. | |
| 7,157,176 B2 * | 1/2007 | Tanuma | 429/483 |
| 7,220,514 B2 * | 5/2007 | Yasumoto et al. | 429/490 |
| 7,285,354 B2 * | 10/2007 | Ueyama et al. | 429/535 |
| 7,291,419 B2 * | 11/2007 | Yan et al. | 429/483 |
| 7,390,528 B2 * | 6/2008 | Morii | 427/115 |
| 7,837,819 B2 * | 11/2010 | Lee et al. | 156/247 |
| 7,955,750 B2 * | 6/2011 | Leistra et al. | 429/508 |
| 7,955,758 B2 * | 6/2011 | Yan et al. | 429/535 |
| 2002/0144394 A1 * | 10/2002 | Uchida et al. | 29/623.5 |
| 2003/0091891 A1 | 5/2003 | Yoshida et al. | |
| 2003/0108781 A1 | 6/2003 | Oh et al. | |
| 2004/0071881 A1 | 4/2004 | Wang et al. | |
| 2004/0209138 A1 * | 10/2004 | Ueyama et al. | 429/30 |
| 2004/0258979 A1 | 12/2004 | Ye et al. | |

FOREIGN PATENT DOCUMENTS

| | | | |
|---|---|---|---|
| CN | 1560949 A | * | 1/2005 |
| EP | 1 489 677 A2 | | 12/2004 |
| JP | 2004-311057 | | 11/2004 |
| JP | 2006-134611 | | 5/2006 |
| WO | WO 02/39525 A1 | | 5/2002 |
| WO | WO 02/061871 A2 | | 8/2002 |
| WO | WO 2005/048388 A1 | | 5/2005 |
| WO | WO 2006/074901 A2 | | 7/2006 |
| WO | WO 2007124011 A3 | * | 4/2008 |

OTHER PUBLICATIONS

Patent Abstracts of Japan, Publication No. 2004-311057, Nov. 4, 2004.

Patent Abstracts of Japan, Publication No. 2006-134611, May 25, 2006.

U.S. Appl. No. 60/872,444, filed Apr. 21, 2006 (formerly U.S. Appl. No. 11/408,787, converted to provisional by petition filed Apr. 20, 2007), entitled "Catalyst-Coated Membrane and Method for Making the Same".

* cited by examiner

METHODS OF MAKING COMPONENTS FOR ELECTROCHEMICAL CELLS

CROSS-REFERENCE TO RELATED APPLICATION

This application claims the benefit under 35 U.S.C. §119(e) of U.S. Provisional Patent Application No. 60/872,444, filed Apr. 21, 2006 (formerly U.S. application Ser. No. 11/408,787, converted to provisional by Petition dated Apr. 20, 2007), which provisional application is incorporated herein by reference in its entirety.

BACKGROUND

1. Field of the Invention

The present invention relates to methods of making components for electrochemical cells, in particular, catalyst-coated membranes, gas diffusion electrodes, and membrane electrode assemblies.

2. Description of the Related Art

Electrochemical fuel cells convert fuel and oxidant into electricity. Solid polymer electrochemical fuel cells generally employ a membrane electrode assembly that includes a solid polymer electrolyte membrane disposed between two electrodes. The membrane electrode assembly is typically interposed between two electrically conductive flow field plates to form a fuel cell. These flow field plates act as current collectors, provide support for the electrodes, and provide passages for the reactants and products. Such flow field plates typically include fluid flow channels to direct the flow of the fuel and oxidant reactant fluids to an anode electrode and a cathode electrode of each of the membrane electrode assemblies, respectively, and to remove excess reactant fluids and reaction products. In operation, the electrodes are electrically coupled for conducting electrons between the electrodes through an external circuit. Typically, a number of fuel cells are electrically coupled in series to form a fuel cell stack having a desired power output.

The anode electrode and the cathode electrode each contain a layer of anode catalyst and cathode catalyst, respectively. The catalyst may be a metal, an alloy or a supported metal/alloy catalyst, for example, platinum supported on carbon black. The catalyst layer typically contains an ion conductive material, such as Nafion®, and, optionally, a binder, such as polytetrafluoroethylene. Each electrode further includes an electrically conductive porous substrate, such as carbon fiber paper or carbon cloth, for reactant distribution and/or mechanical support. The thickness of the porous substrate typically ranges from about 50 to about 250 microns. Optionally, the electrodes may include a porous sublayer disposed between the catalyst layer and the substrate. The sublayer usually contains electrically conductive particles, such as carbon particles, and, optionally, a water repellent material for modifying its properties, such as gas diffusion and water management.

One method of making membrane electrode assemblies includes applying a layer of catalyst to a porous substrate in the form of an ink or a slurry typically containing particulates and dissolved solids mixed in a suitable liquid carrier. The liquid is then removed to leave a layer of dispersed particulates, thereby forming an electrode. An ion-exchange membrane, such as a polymer electrolyte membrane, is then assembled with an anode electrode and a cathode electrode contacting opposite surfaces of the membrane such that the catalyst layers of the electrodes are interposed between the membrane and the respective substrate. The assembly is then bonded, typically under heat and pressure, to form a membrane electrode assembly. When sublayers are employed, the sublayer may be applied to the porous substrate prior to application of the catalyst. The substrate is commonly referred to as a gas diffusion layer or, in the case when a sublayer is employed, the combination of the substrate and sublayer may also be referred to as a gas diffusion layer.

Conventional methods of applying catalyst to gas diffusion layers to form gas diffusion electrodes include screen-printing and knife-coating. However, when applying low loadings of catalyst to a substrate to form a gas diffusion electrode, it is difficult to obtain a smooth, continuous catalyst layer (i.e., no discontinuities across the layer) with a uniform thickness due to the surface roughness of the substrate. This can result in fuel cell performance and/or durability being comprised.

Alternatively, a layer of catalyst can be applied onto both surfaces of the polymer electrolyte membrane to form a catalyst-coated membrane, and then assembled with porous substrates to form a membrane electrode assembly. For example, a catalyst slurry may be applied directly onto the membrane by microgravure coating, knife-coating, or spraying.

However, the use of a catalyst containing a catalytic material and a hydrophobic binder is desirable for fuel cell durability. As discussed in U.S. Pat. No. 6,517,962, fuel cells in series are potentially subject to voltage reversal, a situation in which a cell is forced to opposite polarity by the other cells in series. This can occur when a cell is unable to produce the current forced through it by the rest of the cells. Damage due to voltage reversal can be mitigated by increasing the amount of water available for electrolysis during reversal, thereby using the current forced through the cell in the more innoculous electrolysis of water rather than the detrimental oxidation of anode components. By restricting the passage of this water through the anode structure and into the exhaust fuel stream, more water remains in the vicinity of the catalyst. This can be accomplished, for example, by making the anode catalyst layer impede the flow of water (either in the vapor or the liquid phase). For instance, the addition of a hydrophobic material such as PTFE and/or FEP to these layers will make them more hydrophobic, thereby hindering the flow of water through the anode. However, if these polymers are not sintered, they may not be sufficiently hydrophobic and may wash out of the catalyst layer over time. Using conventional methods of applying the catalyst layer directly to the membrane, the catalyst layer would have to be sintered with the membrane. However, sintering temperatures are usually higher than the thermal degradation temperature of the ionomer. For example, Nafion® membranes typically start to decompose at about 250° C. Thus, if the membrane is coated with the catalyst having a hydrophobic binder and then subjected to temperatures sufficient to sinter the hydrophobic binder (e.g., 330° C. for PTFE), the ion-conducting and water uptake properties of the ionomer may be decreased or destroyed.

Accordingly, while advances have been made in this field, there remains a need for improved methods of making gas diffusion electrodes and catalyst-coated membranes. The present invention addresses this issue and provides further related advantages.

BRIEF SUMMARY

Briefly, the present invention relates to methods of making components for electrochemical fuel cells.

In one embodiment, the method comprises: forming a first transfer assembly, the first transfer assembly comprising a first catalyst layer comprising a first catalytic material and a hydrophobic binder on a surface of a first release sheet; heating the first catalyst layer to a sintering temperature of at least 250° C. to form a sintered first catalyst layer; transferring the sintered first catalyst layer to a first surface of a polymer electrolyte membrane; and removing the first release sheet from the sintered first catalyst layer after bonding.

In another embodiment, the method comprises: forming a diffusion sublayer on a surface of a release sheet; forming a catalyst layer comprising a first catalytic material on the diffusion sublayer; transferring the catalyst layer to a surface of an ion exchange membrane; and removing the first release sheet from the diffusion sublayer. In some embodiments, the catalyst layer may comprise a hydrophobic binder or an ionomer.

In yet another embodiment, the method comprises: forming a first catalyst layer comprising a catalytic material on a surface of a release sheet; forming a first diffusion sublayer on a first surface of the first catalyst layer; forming a second diffusion sublayer on a surface of a gas diffusion substrate; transferring the first diffusion sublayer to the second diffusion sublayer; and removing the first release sheet from the first catalyst layer to form a gas diffusion electrode.

These and other aspects will be evident upon reference to the attached drawings and following detailed description.

BRIEF DESCRIPTION

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve figure legibility. Further, the particular shapes of the elements, as drawn, are not intended to convey any information regarding the actual shape of the particular elements, and have been solely selected for ease of recognition in the figures.

DETAILED DESCRIPTION OF THE INVENTION

Unless the context requires otherwise, throughout the specification and claims which follow, the word "comprise" and variations thereof, such as "comprises" and "comprising" are to be construed in an open, inclusive sense, that is as "including but not limited to".

As used herein and in the appended claims, "sintering" means stabilization of the hydrophobic polymer, typically by heat treatment to temperatures greater than about 250° C. One skilled in the art will appreciate that sintering conditions will be different for different polymers. For example, suitable sintering conditions include sintering temperatures that range from about 330° C. to about 420° C. for polytetrafluoroethylene ("PTFE"), about 250° C. to about 280° C. for fluorinated ethylene propylene ("FEP") and about 300° to about 310° C. for perfluoroalkoxy ("PFA").

In the present context, "loading" refers to the amount of material that is formed or applied to a substrate, and is usually expressed as the mass of material per unit surface area of the substrate.

As used herein, "homogeneous" means that the constituents are substantially uniformly dispersed in the mixture.

The present invention is related to methods of making membrane electrode assembly components by bonding catalyst layers to a polymer electrolyte membrane to form a catalyst-coated membrane ("CCM") or to a gas diffusion layer ("GDL") to form a gas diffusion electrode ("GDE").

Figure 1A:
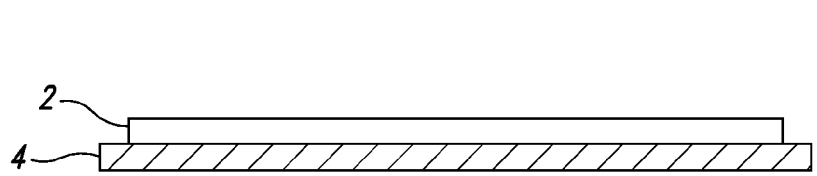
FIGS. 1A to 1D show a sectional view representing a series of steps for forming a catalyst-coated membrane according to a first embodiment of the present invention.
Figure 1B:
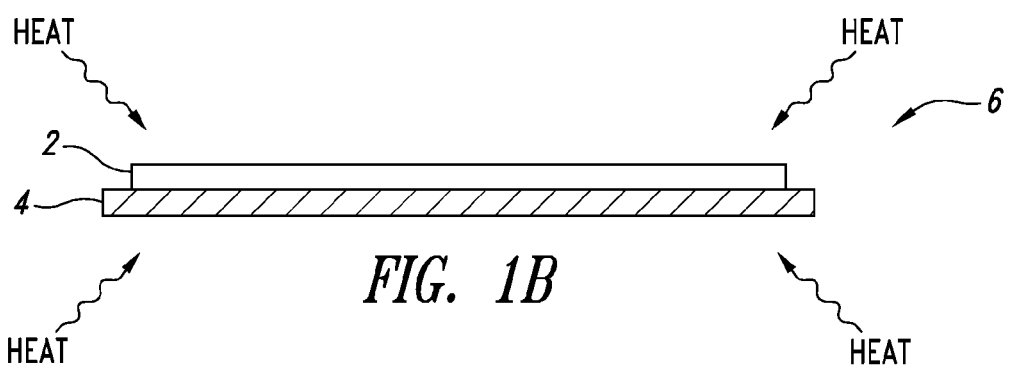
Figure 1C:
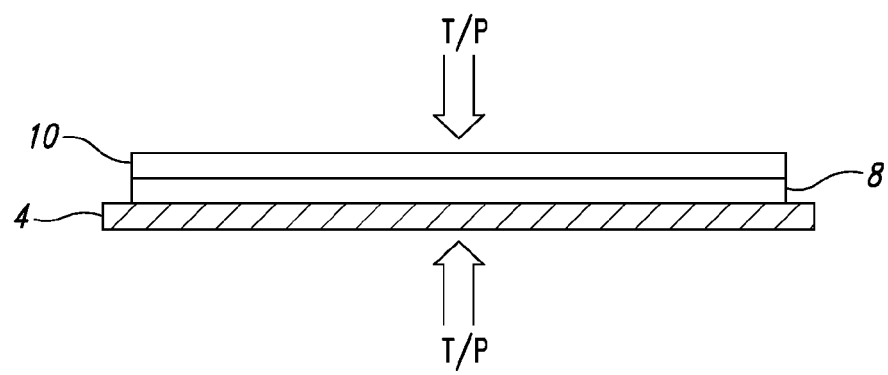
Figure 1D:
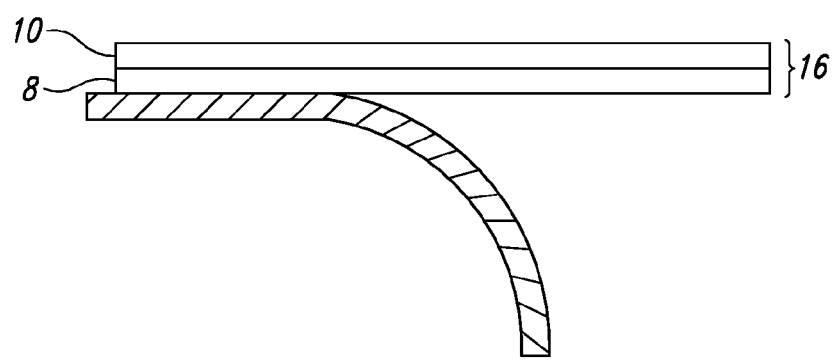

According to a first embodiment of the present invention, a method of making a CCM is shown in FIGS. 1A to 1D. The method includes forming a catalyst layer 2 on a release sheet 4 to form a transfer assembly 6 (FIG. 1A); heating catalyst layer 2 to a sintering temperature equal to or greater than about 250° C. (FIG. 1B) to yield a sintered catalyst layer 8; transferring sintered catalyst layer 8 to a membrane 10 (FIG. 1C) at a suitable transfer temperature and/or pressure ("T/P"); and removing the backing layer (FIG. 1D).

With reference to FIG. 1A, catalyst layer 2 contains a catalytic material, such as a noble metal or compounds thereof, a supported noble metal, a supported noble metal compound, or combinations thereof. Catalyst layer 2 also contains a hydrophobic binder, such as PTFE, FEP, PFA, or combinations thereof, and preferably does not contain an ionomeric material. The constituents of the catalyst layer may first be dispersed in a suitable liquid carrier such as an alcohol, water, or combinations thereof, homogeneously blended to form a dispersion, and subsequently applied to the release sheet. In some embodiments, the dispersion may further include a dispersion-stabilizing substance, for example, a surfactant, such as Triton®-X or Tergitol, and/or a pore former, such as methylcellulose. Any method known in the art for applying a dispersion may be used, such as, but not limited to, knife-coating, screen-printing, slot die coating, microgravure coating, decal transferring, and spraying. In some embodiments, the liquid carrier may be removed or partially removed prior to sintering by, for example, evaporation. Alternatively, the liquid carrier may be removed during sintering.

Suitable release sheet materials should be inert, non-adhering, non-porous and heat-resistant to the highest temperature to which it will be subjected so that the release sheet does not deform and may be reused. In one example, the release sheet is a metal sheet, such as a stainless steel plate with a 2SB finish, a K05 metal coating, or ceramic coating; an aluminum sheet; or a heat-resistant polymeric film, for example, a polyimide film such as Kapton®. If desired, the release sheet may be pre-treated with a release agent prior to forming layers thereon to facilitate removal of the release sheet from the catalyst layer or diffusion sublayer after transferring. The release agent may be, an alcohol, such as a polyvinyl alcohol.

As shown in FIG. 1C, sintered catalyst layer 8 is transferred to membrane 10 after sintering by applying heat and/or pressure (T/P). For most solid polymer electrolyte membranes, suitable transfer temperatures may range from about 90° C. to about 200° C., and suitable transfer pressures may range from about 5 to about 40 bar. Preferably, the opposing surface of membrane 10 is supported by a support material (not shown) during transferring. Support material should be inert, non-adhering, non-porous and heat-resistant to the highest temperature to which it will be subjected, and does not need to be the same material as release sheet 4 because the transfer temperature is typically lower than the sintering temperature. For example, support material may be a PTFE, polyethylene, polypropylene, or polyester film, such as Mylar®. Release sheet 4 and support material are removed from the sintered catalyst layer after transferring to form a catalyst-coated membrane 16, as shown in FIG. 1D.

Figure 2A:
FIGS. 2A and 2B show a sectional view representing the steps for forming a catalyst-coated membrane according to a further embodiment of the present invention.
Figure 2B:

FIGS. 2A and 2B are illustrations of a further embodiment of the present invention, wherein a diffusion sublayer 14 is formed on release sheet 4 (FIG. 2A) and then a catalyst layer 2 is formed on diffusion sublayer 14 (FIG. 2B), prior to sintering and transferring. Diffusion sublayer 14 contains an electrically conductive material, which may be fibrous or particulate. For example, the conductive material is carbon or graphite, such as, but not limited to, carbon blacks, graphitized carbon blacks, flake graphites, spherical graphites, chopped carbon fibers, milled carbon fibers, carbon whiskers, carbon nanotubes, chopped graphite fibers, milled graphite fibers, graphite whiskers, and graphite nanotubes, or combinations thereof. In some embodiments, it may be desirable to incorporate a hydrophobic binder into the diffusion sublayer to alter the water transport properties thereof and/or to improve adhesion between the layers. Diffusion sublayer 14 may be formed on release sheet 4 by dispersing the constituents in a suitable liquid carrier and then applied thereon by methods described in the foregoing.

It is anticipated that the diffusion sublayer may help transfer the catalyst layer to the membrane. The inventors have discovered that when using prior art methods of directly transferring a catalyst layer to the membrane, incomplete transfer occurs (i.e., a portion of the catalyst layer may remain on the release sheet after transferring), particularly when the catalyst layer thickness is low, for example, equal to or less than about 5 microns, and typically when the catalyst loading is low, for example, equal to or less than about 0.15 mg Pt/cm$^2$. Incomplete transfer of the catalyst layer is undesirable because it results in fuel cell performance loss, durability, and cost issues. However, by employing a diffusion sublayer between the release sheet and the catalyst layer, as shown in FIGS. 2A and 2B, the catalyst layer can be completely transferred to the membrane.

Figure 3A:
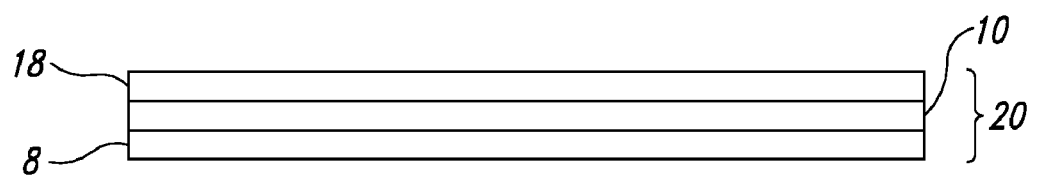
FIGS. 3A to 3C show a sectional view representing the steps for forming a catalyst-coated membrane according to yet a further embodiment of the present invention.

In other embodiments, a second catalyst layer 18 may be formed on an opposing surface of membrane 10 to form CCM 20, as shown in FIG. 3A. Catalyst layer 18 may contain the same composition of materials as in catalyst layer 2 in similar or different amounts, or may contain a different composition of materials, for example, catalyst with an ionomer. A catalyst layer with an ionomer, such as a fluorinated- and/or hydrocarbon-based ionomer, may be beneficial for uses where improved ionic conductivity in the catalyst layer is desired. One of ordinary skill in the art will readily select a catalyst composition suitable for a given application.

Figure 3B:
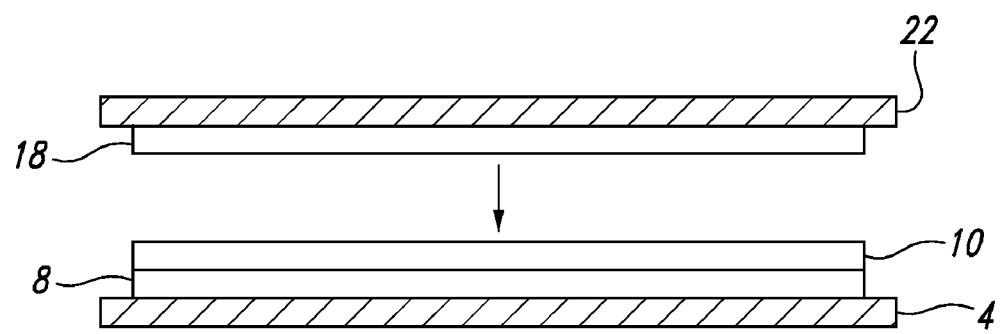
Figure 3C:
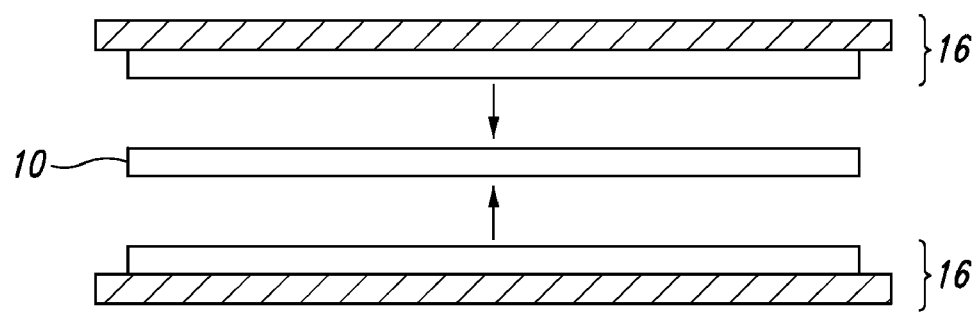

In some embodiments, catalyst layer 18 may be transferred to membrane 10 in a similar manner to that as described in the foregoing (i.e., forming catalyst layer 18 on a release sheet 22), either subsequently (FIG. 3B) or simultaneously (FIG. 3C). Optionally, a diffusion sublayer, such as the one described in FIGS. 2A and 2B, may also be transferred with catalyst layer 18 (not shown). Note that if catalyst layer 18 contains an ionomer, then the diffusion sublayer should be sintered prior to forming catalyst layer 16 thereon. In other embodiments, catalyst layer 18 can be directly applied to the membrane by any method known in the art, before or after transferring (not shown).

In further embodiments, the CCM of the foregoing embodiments may be assembled with GDLs and/or GDEs to form a membrane electrode assembly ("MEA"). For example, with reference to FIG. 1D, a GDL may be placed adjacent catalyst layer 8 while a GDE may be placed adjacent an opposing second surface of membrane 10. Alternatively, with reference to FIG. 3A, a GDL may be placed adjacent sintered catalyst layer 8 while another GDL may be placed adjacent catalyst layer 18. In either case, the assembled MEA may be subjected to a bonding temperature and/or bonding pressure to substantially bond each of the components together. One skilled in the art can readily determine suitable bonding temperatures, pressures, and duration.

Figure 4A:
FIGS. 4A to 4E show a sectional view representing a series of steps for forming a gas diffusion electrode according to another embodiment of the present invention.
Figure 4B:
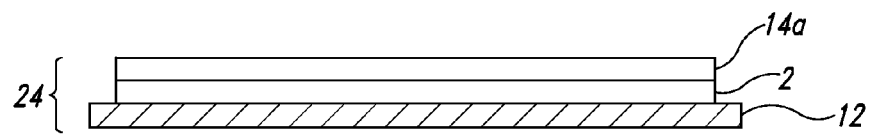
Figure 4C:
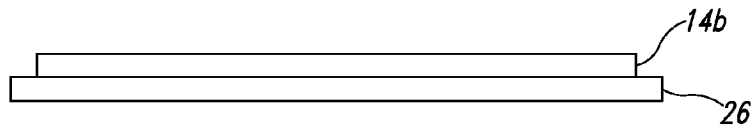
Figure 4D:
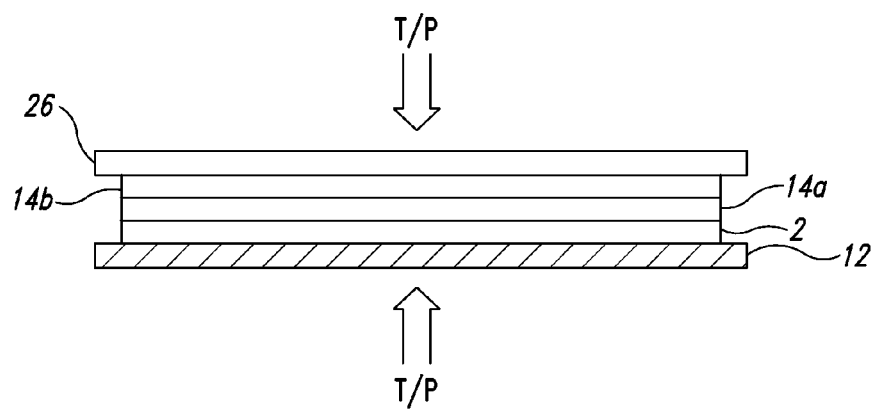
Figure 4E:
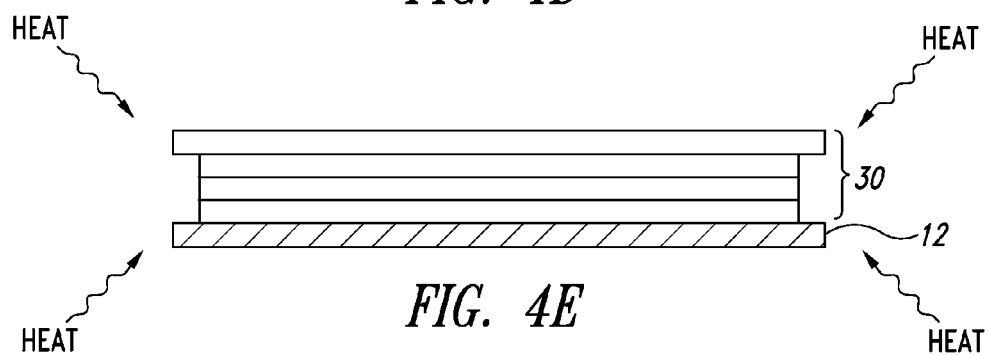

According to another embodiment of the present invention, a method of making a GDE is disclosed. The method includes forming a catalyst layer 2 on a support material 12 (FIG. 4A); forming a diffusion sublayer 14a on catalyst layer 2 to form a transfer assembly 24 (FIG. 4B); forming an additional diffusion sublayer 14b on a diffusion substrate 26 to form a partial GDL 28 (FIG. 4C); transferring diffusion sublayer 14a to diffusion sublayer 14b (FIG. 4D); and sintering to form a GDE 30 (FIG. 4E). Support material 12 may be removed before or after sintering (not shown).

Catalyst layer 2 preferably contains a hydrophobic binder and a catalytic material, such that described in the foregoing. Furthermore, diffusion sublayers 14a, 14b may contain the same constituents as described in previous embodiments. In this embodiment, diffusion sublayers 14a, 14b may have the same or different compositions, and may have the same or different loadings. In addition, the liquid carrier of catalyst layer 2 may be removed or partially removed prior to forming first diffusion sublayer 14a thereon.

Any suitable diffusion substrate material may be used, provided that it is electrically conductive and porous. Exemplary diffusion substrate materials include carbonized or graphitized carbon fiber non-woven mats such as, but not limited to, TGP-H-090 (Toray Industries Inc., Tokyo, Japan); AvCarb® P50 and EP-40 (Ballard Material Products Inc., Lowell, Mass.); and GDL 24 and 25 series material (SGL Carbon Corp., Charlotte, N.C.). The choice of porous substrates is not essential to the present invention and one of ordinary skill in the art will be able to select a suitable porous substrate for a given application. In some embodiments, the porous substrate may be hydrophobized, such as by impregnating the substrate in a solution containing a hydrophobic binder, which is then dried and/or sintered prior to application of diffusion sublayer 14b, or simultaneously sintered with diffusion sublayers 14a, 14b and catalyst layer 2 after transferring.

Transferring conditions may be similar to those described in the foregoing embodiments. Furthermore, in some embodiments, the liquid carrier of first and/or second sublayers 14a, 14b is removed during transferring.

With reference to FIG. 4E, catalyst layer 2 and diffusion sublayers 14a, 14b are sintered after transferring of diffusion sublayers 14a, 14b. Alternatively, catalyst layer 2 and diffusion sublayers 14a, 14b may be separately sintered before transferring or simultaneously sintered during transferring (not shown). Again, support material 12 may be any of the materials described in the foregoing, so long as it is heat-resistant to the highest temperature to which it will be subjected (e.g., transferring or sintering temperatures, depending on when support material 12 is removed).

The inventors have discovered that when transferring a catalyst layer containing a hydrophobic binder to the GDL, incomplete transfer of the catalyst typically occurs, particularly when transferring thin catalyst layers. However, by directly applying first diffusion sublayer 14a on catalyst layer 2, transfer of catalyst layer 2 is improved. Furthermore, by applying a second diffusion sublayer 14b on diffusion substrate 26 and removing the liquid carrier in first and/or second diffusion sublayers 14a, 14b during transferring, adhesion between diffusion sublayers 14a, 14b is also enhanced. As a result, catalyst layer 2 can be completely transferred and adhesion between each of the layers may be improved compared to conventional methods.

In further embodiments, GDE 30 may be assembled with a membrane and another GDE, or may be assembled with a CCM and GDL to form a MEA. For example, with GDE 30 may be assembled with membrane 10 such that the catalyst layer 8 contacts membrane 10 (not shown). Another GDE is then assembled adjacent the opposing surface of membrane 10 to form a MEA. Alternatively, GDE 30 may be assembled with a CCM, such as the one shown in FIG. 1D and a GDL adjacent catalyst layer 8, to form a MEA (not shown). Again, the assembled MEA may be bonded, as described in the foregoing.

In any of the above embodiments, an adhesive layer may be employed between any of the layers prior to transferring, such as that described in U.S. Patent Application No. 2004/0258979. The adhesive layer may include an ionomer and, optionally, carbon and/or graphite particles. It is anticipated that the adhesive layer may improve adhesion and may enhance proton conductivity through the catalyst layer.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

While particular elements, embodiments, and applications of the present invention have been shown and described, it will be understood that the invention is not limited thereto since modifications may be made by those skilled in the art without departing from the spirit and scope of the present disclosure, particularly in light of the foregoing teachings.

What is claimed is:

1. A method of making a component for an electrochemical fuel cell comprising:
    forming a diffusion sublayer on a surface of a release sheet;
    forming a catalyst layer comprising a catalytic material on the diffusion sublayer;
    transferring the catalyst layer to a surface of a solid polymer electrolyte membrane;
    removing the release sheet from the diffusion sublayer; and
    bonding a first gas diffusion substrate to the diffusion sublayer following removal of the release sheet.

2. The method of claim 1, wherein the diffusion sublayer comprises a carbon material, a graphitic material, or combinations thereof.

3. The method of claim 1, wherein transferring comprises subjecting the catalyst layer and the solid polymer electrolyte membrane to at least one of heat and pressure.

4. The method of claim 1, wherein the catalyst layer further comprises an ionomer.

5. The method of claim 1, further comprising bonding a gas diffusion electrode against an opposing surface of the solid polymer electrolyte membrane, the gas diffusion electrode comprising a second gas diffusion substrate, a second catalyst layer, and a second diffusion sublayer interposed therebetween, such that the second catalyst layer contacts the opposing surface of the solid polymer electrolyte membrane, to form a membrane electrode assembly.

6. A method of making a component for an electrochemical fuel cell comprising:
    forming a catalyst layer comprising a catalytic material on a surface of a release sheet;
    forming a first diffusion sublayer on a surface of the catalyst layer;
    forming a second diffusion sublayer on a surface of a gas diffusion substrate;
    bonding the first diffusion sublayer to the second diffusion sublayer;
    removing the release sheet from the catalyst layer to form a gas diffusion electrode; and
    contacting the gas diffusion electrode against a first surface of a solid polymer electrolyte membrane such that the catalyst layer faces the first surface.

7. The method of claim 6, wherein the catalyst layer and the first diffusion sublayer further comprise a hydrophobic binder, and the method further comprises heating the first diffusion sublayer and the catalyst layer to a sintering temperature of at least 250° C.

8. The method of claim 6, wherein the second diffusion sublayer comprises a hydrophobic binder, and the method further comprises heating the second diffusion sublayer to a sintering temperature of at least 250° C.

9. The method of claim 6, wherein the first and second diffusion sublayers comprise a carbon material, graphitic material, or combinations thereof.

10. The method of claim 6, wherein the first and second diffusion sublayers are the same.

11. The method of claim 6, further comprising removing a liquid carrier of at least one of the first and second diffusion sublayers during bonding.

12. The method of claim 6, further comprising:
    contacting a second gas diffusion electrode against an opposing second surface of the solid polymer electrolyte membrane; and
    bonding the gas diffusion electrodes to the solid polymer electrolyte membrane.

* * * * *